March 27, 1956  T. L. URQUHART  2,739,645
AIRCRAFT HANGAR DOOR
Filed Nov. 29, 1954  8 Sheets-Sheet 1

INVENTOR.
THORNTON L. URQUHART.
BY

March 27, 1956  T. L. URQUHART  2,739,645
AIRCRAFT HANGAR DOOR
Filed Nov. 29, 1954  8 Sheets-Sheet 3
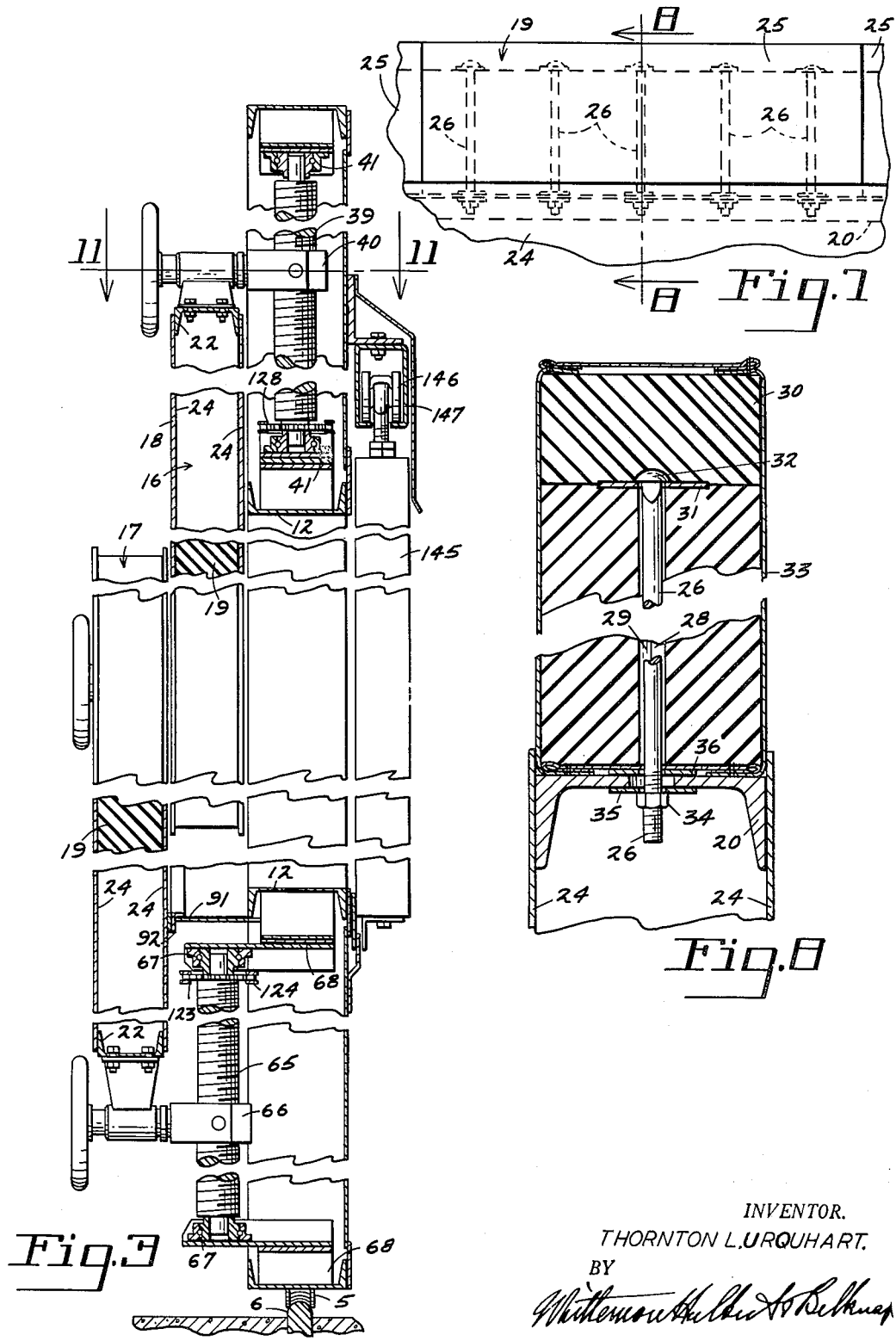
INVENTOR.
THORNTON L. URQUHART.
BY March 27, 1956 T. L. URQUHART 2,739,645
AIRCRAFT HANGAR DOOR
Filed Nov. 29, 1954 8 Sheets-Sheet 4
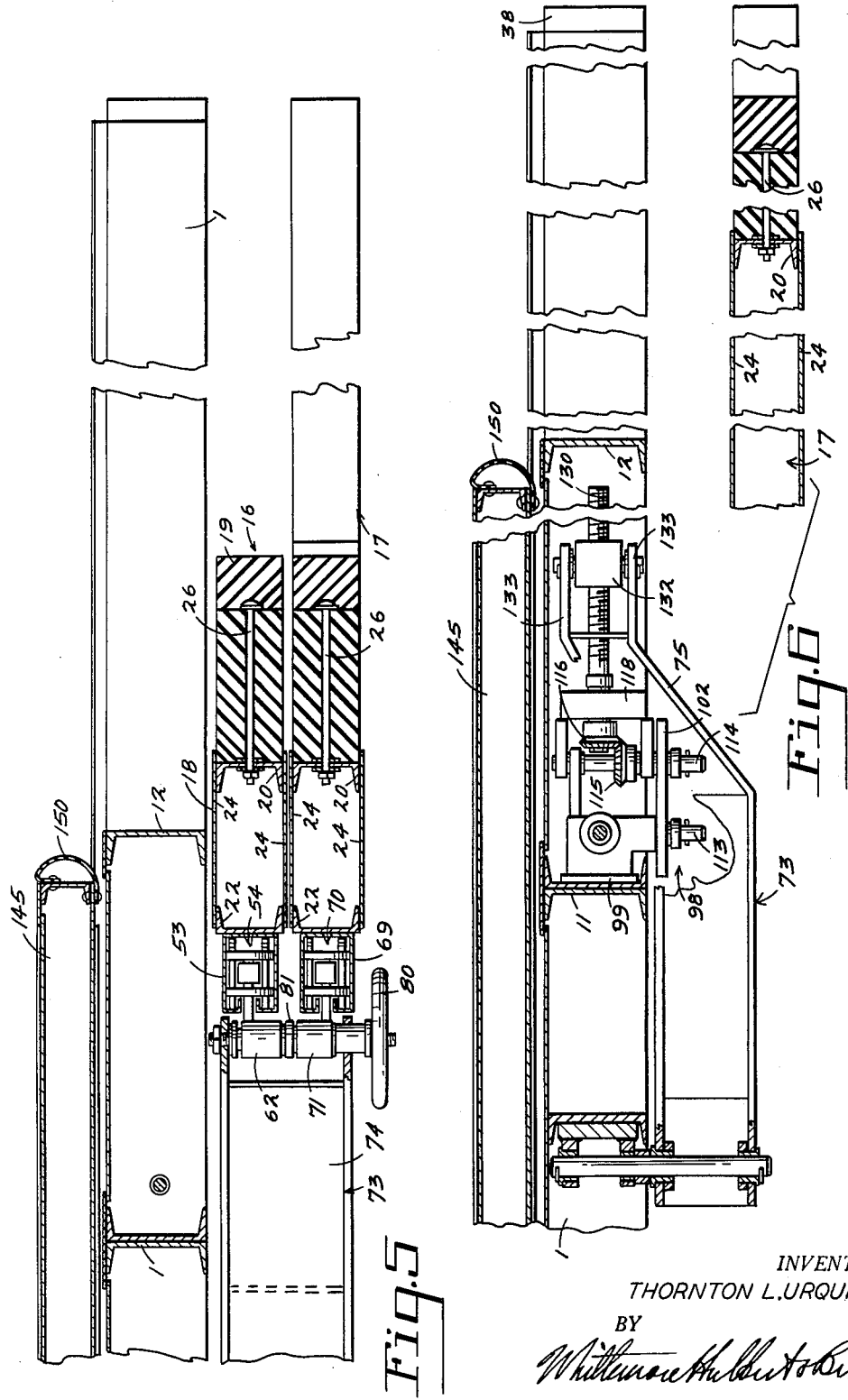
INVENTOR.
THORNTON L. URQUHART.
BY
Whittemore Hulbert & Belknap March 27, 1956 T. L. URQUHART 2,739,645
AIRCRAFT HANGAR DOOR
Filed Nov. 29, 1954 8 Sheets-Sheet 5
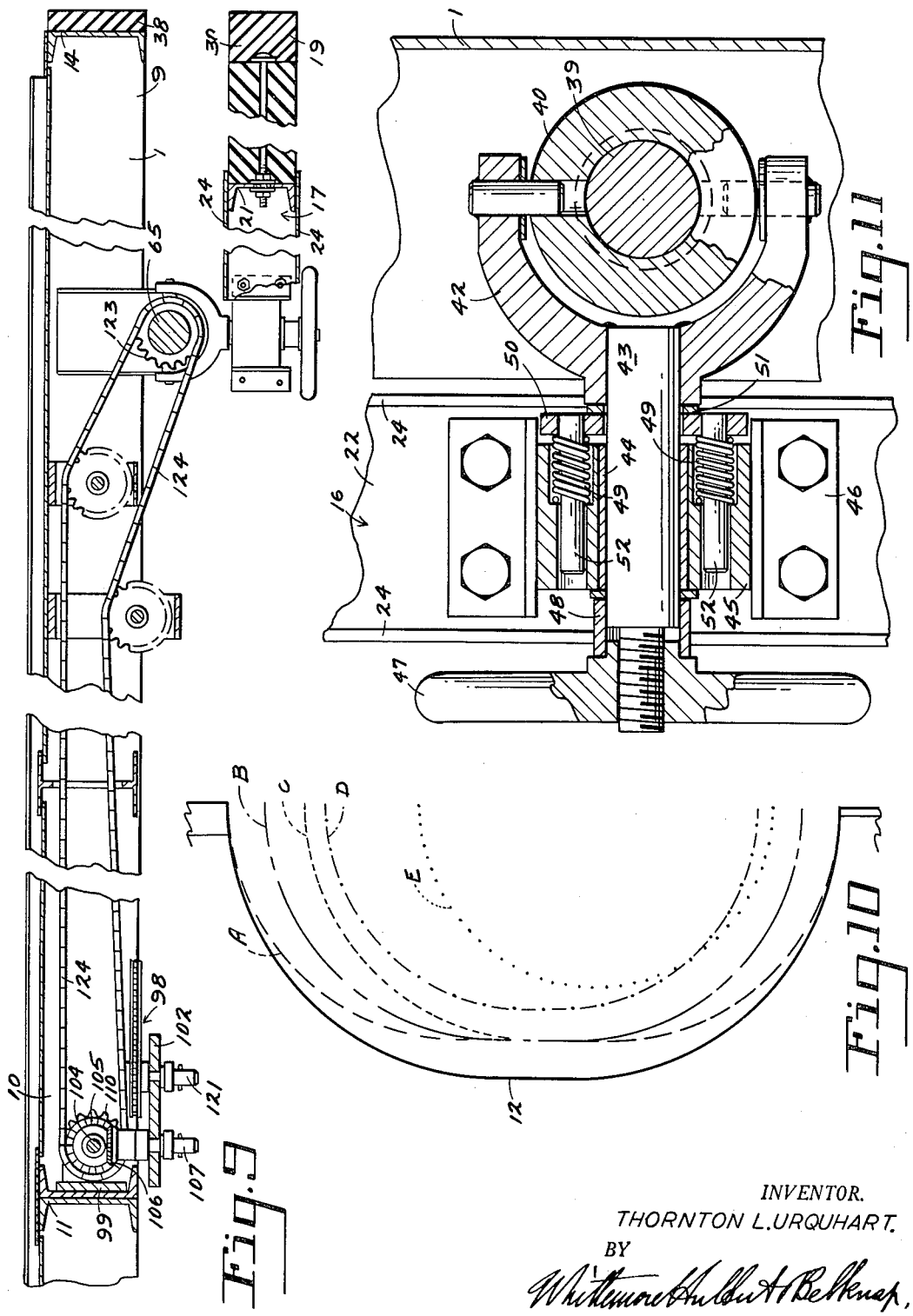
INVENTOR.
THORNTON L. URQUHART.
BY
Whitemore Hulbert Belknap, March 27, 1956 — T. L. URQUHART — 2,739,645
AIRCRAFT HANGAR DOOR
Filed Nov. 29, 1954 — 8 Sheets-Sheet 6
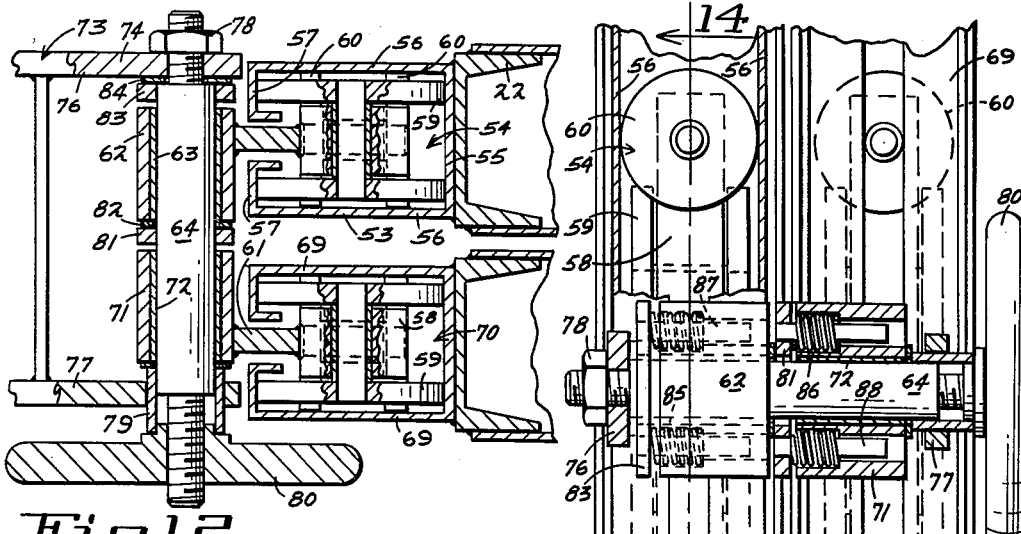
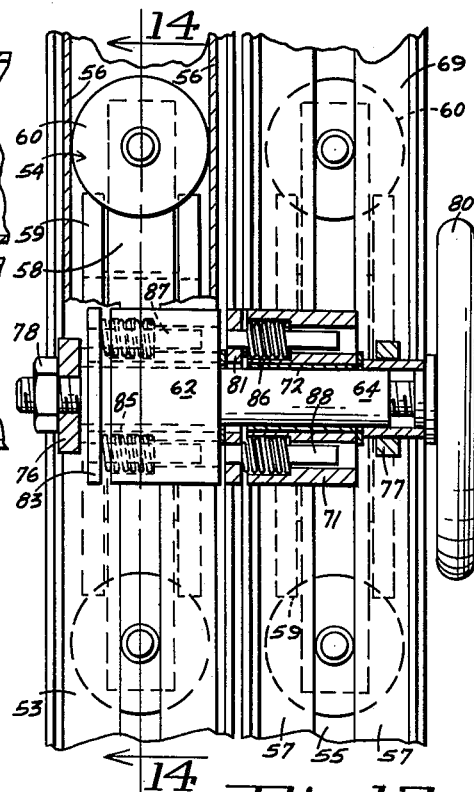
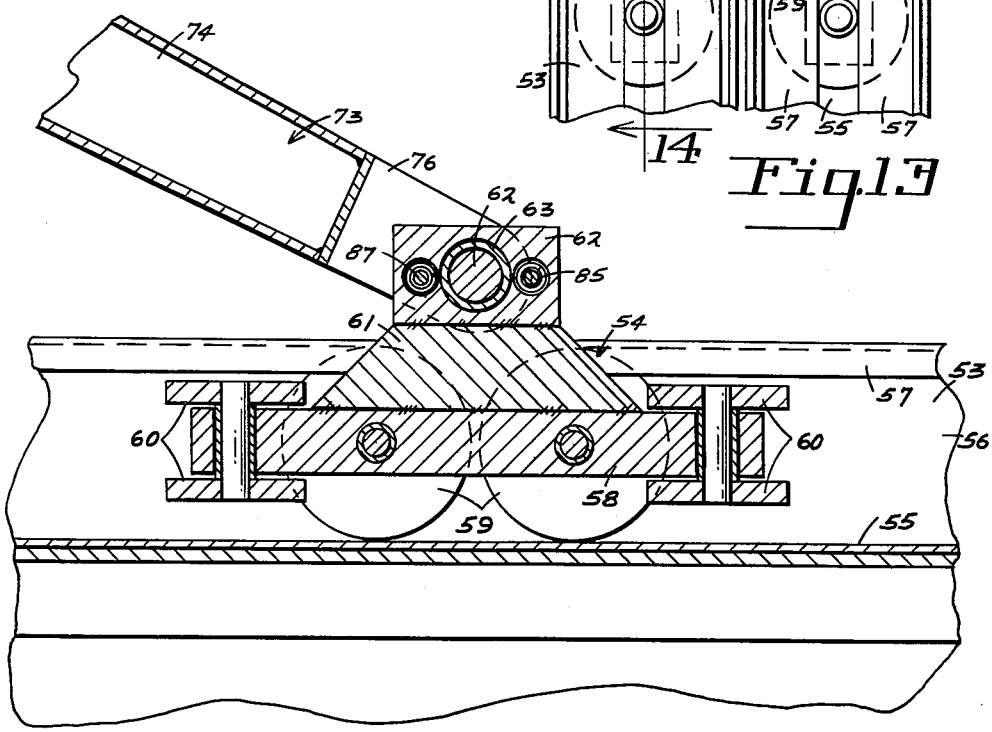
INVENTOR.
THORNTON L. URQUHART.
BY March 27, 1956 T. L. URQUHART 2,739,645
AIRCRAFT HANGAR DOOR
Filed Nov. 29, 1954 8 Sheets-Sheet 7

INVENTOR.
THORNTON L. URQUHART.
BY

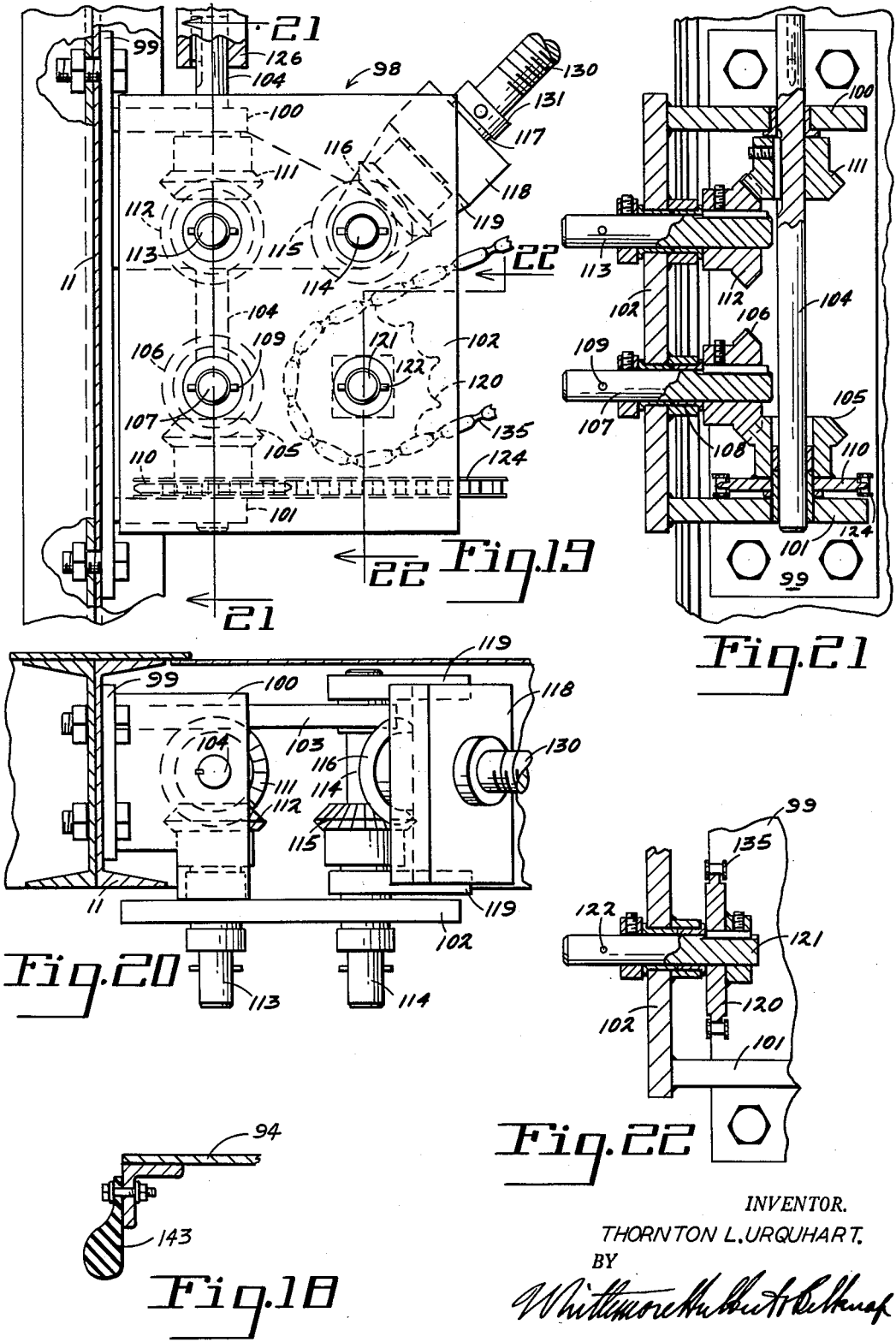

ent Office 2,739,645
Patented Mar. 27, 1956

2,739,645

AIRCRAFT HANGAR DOOR

Thornton L. Urquhart, Farmington, Mich., assignor to Byrne Doors, Inc., Ferndale, Mich., a corporation of Michigan Application November 29, 1954, Serial No. 471,604

12 Claims. (Cl. 160—185)

The invention relates to aircraft hangar doors and refers more particularly to aircraft hangar doors provided with openings for receiving aircraft fuselages.

The invention has for one of its objects to provide an aircraft hangar door for fitting around an aircraft fuselage, the door being so constructed that it is adjustable to a relatively wide range of aircraft fuselages made by various companies.

The invention has for another object to provide a door made of a number of closure elements adjustable to the contour of each of a number of different fuselages and provided with cushioning material for securing snug weathertight engagement.

The invention has for further objects to provide a door having closure elements which in addition to being capable of fitting around a fuselage are adapted to receive an antenna; to provide a door capable of withstanding high wind loads without exceeding specified deflection; to provide a door with means operable from the floor level for adjusting the closure elements; and to provide a door with auxiliary means for closing the fuselage opening when not occupied by a fuselage.

These and other objects of the invention will become apparent from the description taken in connection with the accompanying drawings, in which.

Figure 2:
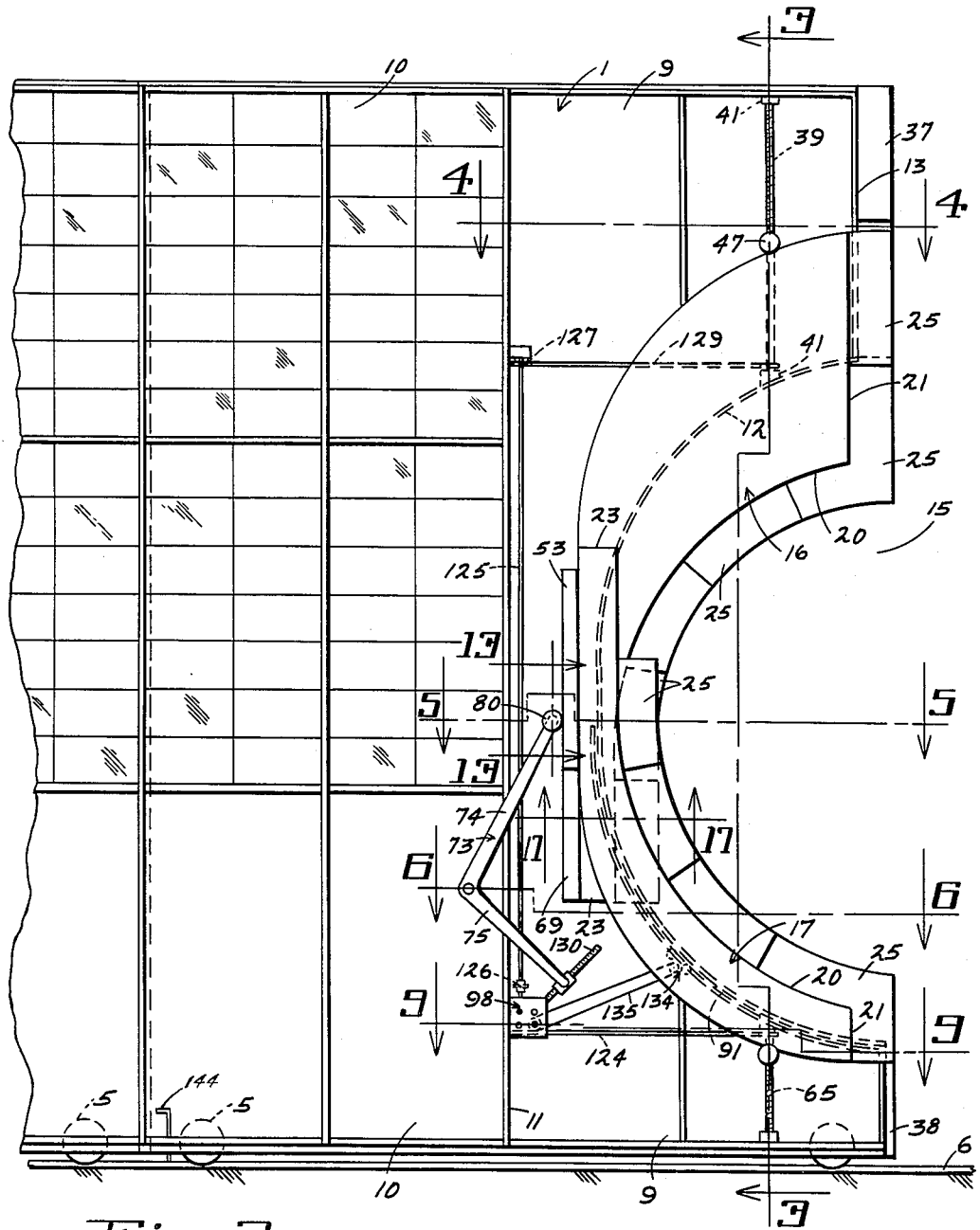
Figure 2 is an inside elevation of a portion thereof.
Figure 15:
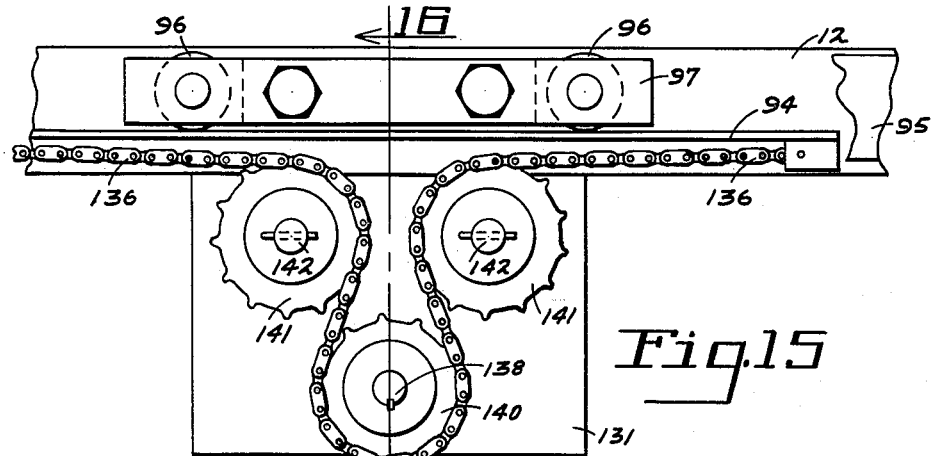
Figure 16:
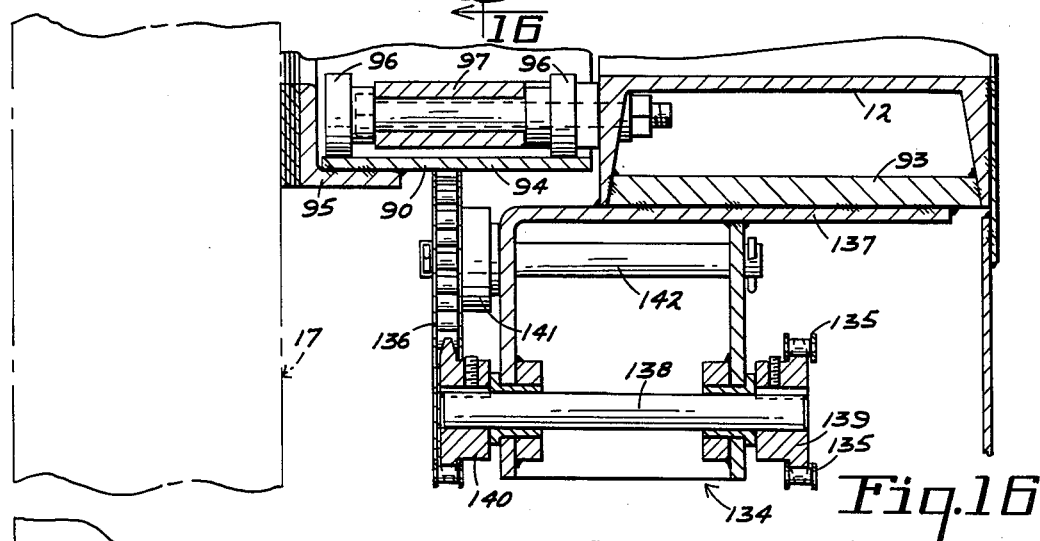
Figure 17:
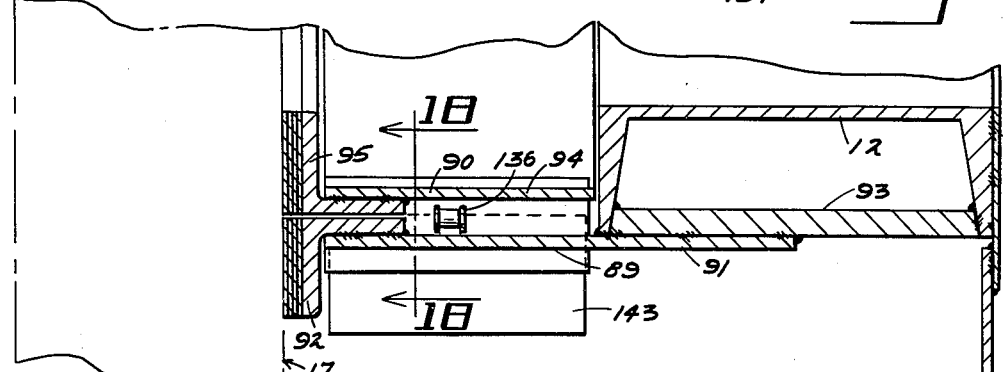

Figures 3, 4, 5 and 6 are enlarged cross sections on the lines 3—3, 4—4, 5—5 and 6—6 respectively of Figure 2;

Figure 7 is an enlarged view of a portion of Figure 2;

Figure 8 is an enlarged cross section on the line 8—8 of Figure 7;

Figure 9 is an enlarged cross section on the line 9—9 of Figure 2;

Figure 10 is a schematic view showing airplane fuselages to which the door can be accommodated;

Figure 11 is an enlarged cross section on the line 11—11 of Figure 3;

Figure 12 is an enlarged view of a portion of Figure 5;

Figure 13 is an enlarged cross section on the line 13—13 of Figure 2;

Figure 14 is a cross section on the line 14—14 of Figure 13;

Figure 15 is an enlarged view of a portion of Figure 2;

Figure 16 is a cross section on the line 16—16 of Figure 15;

Figure 17 is a cross section on the line 17—17 of Figure 2;

Figure 18 is a cross section on the line 18—18 of Figure 17;

Figure 19 is an enlarged view of a portion of Figure 2;

Figure 20 is a top plan view of Figure 18;

Figures 21 and 22 are cross sections on the lines 21—21 and 22—22 respectively of Figure 19.

My invention is particularly applicable to multileaf doors for aircraft hangars in which two leaves are movable toward and away from each other in the same path.

Figure 1:
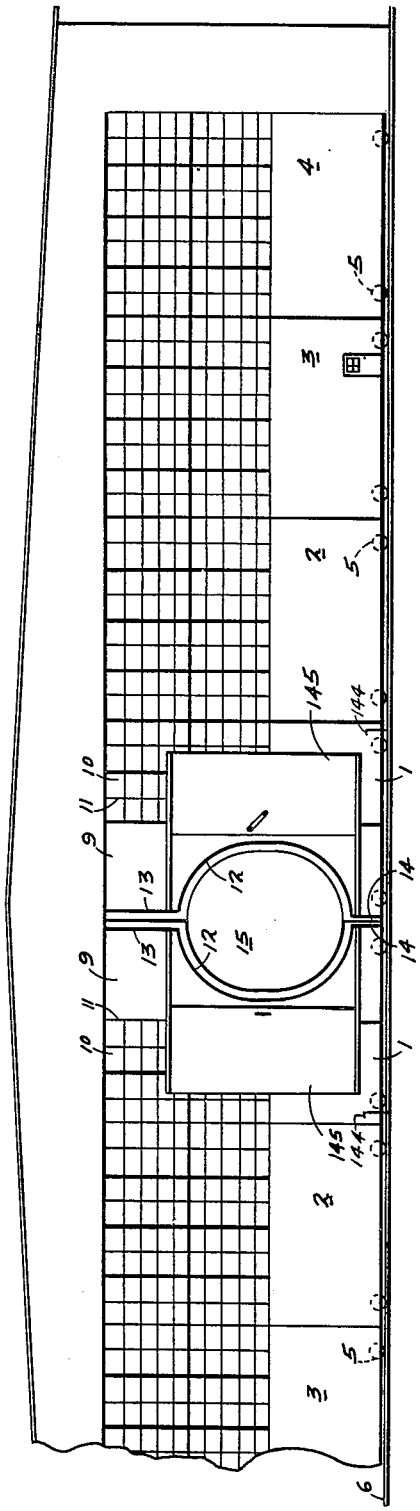
Figure 1 is an outside elevation of an aircraft door embodying the invention.

As illustrated in Figure 1, the door closes the complete entrance of the airplane hangar and is formed of two like groups of leaves 1, 2, 3 and 4 having the same widths, the leaves 1 and 4 being respectively the lead and trailing leaves.

The leaves of each group are preferably arranged within the building in upright parallel relation and the adjacent leaves of each group are transversely offset with respect to each other so that they may be moved relatively to each other to open and closed positions with the adjacent ends of the leaves overlapping in the closed position. Also, the lead leaves of the two groups are movable in the same path and register.

The leaves are provided at their lower edges with the wheels 5 which are movable over suitable tracks 6 in the floor of the airplane hangar and support the leaves. The leaves are provided at their upper edges with the pairs of rollers 7 which engage the depending webs of the T-shaped head members 8 to thereby guide the upper edges of the leaves. The head members are suitably supported from the framework of the building.

Each of the lead leaves 1 is formed in the usual manner of the two sections 9 and 10 secured together with each of the sections having a frame and panels secured to the outsides of the structural members forming the frame. The adjacent vertical structural members 11 of the two sections are preferably bolted together. The leading edge of the section 9 is formed with the curved structural member 12 and the upper and lower structural members 13 and 14 respectively, these structural members being of channel-section facing toward the section 10. The structural member 12 forms the generally semi-elliptic recess 15 and the upper and lower structural members extend vertically from the upper and lower ends of the structural member 12 with the upper structural member offset toward the section 10 with respect to the lower structural member. With the lead leaves 1 in closed position the recesses 15 form a generally semi-elliptic opening for receiving a fuselage of an airplane and the upper structural members 13 are spaced apart to receive the antenna of the airplane.

To close the space between the fuselage and the structural members 12 when the leaves 1 are in closed position, I have provided the upper and lower closure elements 16 and 17 respectively. The upper closure elements are inside their respective lead leaves 1 and the lower closure elements are inside the upper closure elements with the lower portions of the upper closure elements and the upper portions of the lower closure elements overlapping. See Figures 2 and 5.

The upper closure elements are formed of the bodies 18 and the cushions 19. Each of the bodies has a frame, with its leading edge formed by the curved structural member 20 and the straight structural member 21, its trailing edge formed by the curved structural member 22 and its lower edge formed by the structural member 23. These structural members are of channel-section facing toward each other. Each body also has the side plates 24 secured to the structural members 20, 21, 22 and 23 and extending beyond the webs of the structural members 20 and 21 at the leading edge.

Referring to Figures 7 and 8, the cushion 19 is formed of yieldable material and more particularly of foam rubber so that the cushion may be relatively easily compressed and cannot distort or deform the fuselage of the airplane. The cushion is formed of a number of sections 25 secured to the structural members 20 and 21 in end-to-end abutting relation by means of the bolts 26 which extend through the webs of the structural members 20 and 21 and are free to move longitudinally through these webs. Each of the cushion sections 25 is formed of the strips 28 which together form the bores 29 for freely receiving the bolts 26, the portions of the strips at the sides of the bores being bonded to each other. Each of the cushion sections is also formed of the strip 30 extending transversely of and bonded to the ends of the strips 28 beyond the washers 31 which are sleeved over the shanks of the bolts inside their heads 32. The washers are preferably welded to the heads. Each of the cushion sections 25 is enclosed by the envelope 33 which is formed of a suitable flexible waterproof material. To hold the cushion sections against the webs of the structural members, I have provided the nuts 34 threaded on the shanks of the bolts and abutting the washers 35 which have openings for freely receiving the bolt shanks. There are also the washers 36 at the opposite sides of the webs of the structural members through which the bolt shanks freely pass. By reason of the plates 24 extending beyond the webs of the structural members, the cushion sections are held in proper relation to the structural members.

The lower closure elements 17 are formed in the same manner as the upper closure elements. However, the straight structural member 21 of the upper closure element is preferably considerably longer than the corresponding straight structural member of the lower closure element to take care of the greater variation in elevation of the upper portions of the various airplane fuselages as compared with the variation in elevation of their lower portions. In this connection, Figure 10 schematically shows a relatively wide range of airplane fuselages which can be accommodated, the lines A, B, C, D and E representing the contours of the fuselages with the tires inflated and certain tires deflated.

To close the space between the upper structural members 13 when the lead leaves are in closed position, I have provided the cushions 37 (Figure 4) which are of the same construction as the cushions 19 and secured to the webs of the structural members 13 in the same manner as the cushions 19 are secured to the webs of the structural members 20 and 21.

To close the space between the structural members 14 when the lead leaves are in closed position, I have provided the cushions 38 (Figure 9) which are also formed of yieldable material and secured to the webs of the structural members 14. Each cushion is a conventional construction of bulb weathering.

For the purpose of adjusting the upper and lower closure elements to move their cushions against the fuselage of the particular airplane to be engaged, I have provided means connected at spaced points to each of the closure elements for securing a universal movement in one plane of each of the closure elements. In the present instance the adjusting means comprises a screw and nut device and a trolley and track device connected to each closure element.

Referring to Figures 3, 4 and 11, the screw and nut device for each upper closure element 16 comprises the screw 39 and the nut 40. The screw 39 extends vertically and is journalled at its lower and upper ends in the bearings 41 which are secured to the structural member 12 and the upper structural member which forms the top rail of the frame of the lead leaf. The nut 40 which is engaged by the screw 39 is pivotally connected to the yoke 42 fixedly secured to the shaft 43. The shaft is journalled in the bushing 44 sleeved in the block 45 forming part of the bracket 46 and this bracket is secured to the upper side of the upper end portion of the upper closure element 16 and more particularly its structural member 22. To adjust the upper closure element toward its lead leaf, I have provided the hand wheel 47 threaded upon the inner end of the shaft 43 and spaced from the block 45 by the spacer 48, the arrangement being such that by rotating the hand wheel in one direction the bracket 46 and, consequently, the upper closure element 16 is moved toward the lead leaf. To resiliently urge the upper closure element away from the lead leaf, I have provided the coil springs 49 located in bores in the block 45 and abutting the bottoms of the bores and the plate 50 sleeved over the shaft 43 and spaced from the hub of the yoke 42 by the washer 51. The coil springs encircle the pins 52 which extend into the block 45 and the plate 50.

Referring to Figures 5, 12, 13 and 14, the track and trolley device for each upper closure element 16 comprises the track 53 secured to the lower end portion of the structural member 22 of the upper closure element and the trolley 54 engaging the track. The track has a generally channel-shaped section and is formed with the web 55 secured to the structural member 22, the side flanges 56, and the transverse flanges 57 at the free edges of the side flanges. The trolley has the body 58 on which are journalled the two pairs of trolley wheels 59 and the two pairs of trolley wheels 60, the axes of the latter being at right angles to the axes of the former. The trolley wheels 59 are engageable with the web 55 and the transverse flanges 57, and the trolley wheels 60 are engageable with the side flanges 56. The trolley also has the arm 61 extending from the body and connected to the block 62 in which is secured the bushing 63. 64 is a shaft journalled in this bushing.

Referring to Figure 3, the screw and nut device for each lower closure element 17 comprises the screw 65 and the nut 66. The screw extends vertically and is offset to the inside of the building from the lead leaf 1 and is journalled at its upper and lower ends in the bearings 67 upon the brackets 68 carried by the structural member 12 and the structural member forming the lower rail of the frame of the lead leaf. The nut 66 which is engaged by the screw 65 is pivotally connected to the lower side of the lower closure element 17 in the same manner that the nut 40 is pivotally connected to the upper side of the upper closure element 16.

Referring to Figures 5, 12 and 13, the trolley and track device for each lower closure element comprises the track 69 and the trolley 70. The track 69 is constructed in the same manner as the track 53 and is secured to the upper end portion of the lower closure element and is located at the inner side of the track 53. The trolley 70 is constructed in the same manner as the trolley 54 and is connected to the shaft 64 by the block 71 having the bushing 72 in which the shaft is journalled.

The shaft 64 is carried by the lever 73 pivotally mounted on the lead leaf. The lever is a bell crank pivotally connected to the leaf at the junction of its arms 74 and 75. The arm 74 is formed at its free end with the spaced portions or furcations 76 and 77, the furcation 76 encircling the outer end of the shaft 64 and being secured in place by the nut 78 and the furcation 77 encircling the spacer 79 sleeved over the inner end of the shaft. To adjust the upper end portion of the lower closure element toward the lower end portion of the upper closure element and to adjust both portions toward the associated lead leaf, I have provided the hand wheel 80 threaded upon the inner end of the shaft 64 and abutting the spacer 79 and adapted upon being turned in one direction to force the block 71 of the trolley 70 toward the plate 81. This plate acts through the washer 82 to move the block 62 of the trolley 54 toward the plate 83 which abuts the washer 84 resting against the furcation 76. To resiliently urge the trolleys 54 and 70 in the opposite direction, I have provided the coil springs 85 and 86. The coil springs 85 are located in bores in the block 62 and abut the bottoms of the bores and the plate 83, while the coil springs 86 are located in bores in the block 71 and abut the bottoms of the latter bores and the plate 81. The coil springs 85 encircle the pins 87 which extend into the block 62 and the plate 83, and the coil springs 86 encircle the pins 88 which extend into the block 71 and the plate 81.

For the purpose of closing the space between each lead leaf 1 and the associated lower closure element 17 from the lower end of the lower closure element to the associated upper closure element 16, I have provided the stationary closure device 89 and the movable closure device 90. See Figures 17 and 18. The stationary closure device comprises the arcuate plate 91 and the angle 92 secured to the arcuate plate. The arcuate plate 91 fits the edge of the inside flange of the channel-shaped structural member 12 of the lead leaf and extends around the inside flange from its lower end through an angle of approximately 45°. This plate is fixedly secured to the structural member 12 by suitable means, such as the plate 93 inside the structural member 12 and secured to its flanges and the plate 91. The angle 92 has the same curvature as the plate 91 and is co-extensive therewith and extends beyond its free edge. The movable closure device comprises the arcuate plate 94 and the angle 95 secured together and located between the inside flange of the structural member 12 and the lower closure element and overlapping the stationary closure device. The arcuate plate 94 is spaced from the arcuate plate 91 by the adjacent flanges of the angles 92 and 95 and is guided by the rollers 96 engaging the concave face of the arcuate plate. These rollers are mounted on shafts journalled in the block 97 which is mounted on the inside flange of the structural member 12. The angle 95 has the same curvature as the plate 94 and is co-extensive therewith and extends beyond its free edge.

For the purpose of adjusting the upper and lower closure elements 16 and 17 respectively and the movable closure device 90, I have provided operating mechanism which can be readily manually operated. Referring to Figures 2 and 9, a gearing support 98 is provided upon the door section 10 carrying gearing within easy reach from the hangar floor for manual operation. The support is provided with the base plate 99 secured directly to the structural member 11 of the door section 10, the transverse top and bottom plates 100 and 101 respectively secured to the base plate, the inside plate 102 secured to the top and bottom plates, and the plate 103 extending transversely of and secured to the base and top plates.

104 is a shaft journalled in the top and bottom plates 100 and 101 and having journalled thereon the bevel gear 105 which meshes with the bevel gear 106 fixed on the shaft 107. The shaft 107 is journalled in the bearing 108 secured to the inside plate 102 and the shaft extends through the inside plate and is provided at its inner end with a diametral drive pin 109 for engagement by a suitable manually operable crank. The bevel gear 105 has fixedly secured thereto the chain sprocket 110.

The shaft 104 has secured thereto the bevel gear 111 which meshes with the bevel gear 112 fixed on the shaft 113. This shaft is journalled in a bearing like the bearing 108 and extends through the inside plate 102 and is also provided at its inner end with a diametral drive pin like the drive pin 109 for engagement by the same crank.

114 is a shaft journalled in bearings carried by the plates 102 and 103 and extending through the plate 102 and provided at its inner end with a diametral drive pin corresponding to the drive pin 109 adapted to be engaged by the same crank. The shaft 114 has secured thereto the bevel gear 115 which meshes with the bevel gear 116 secured to the shaft 117. This shaft is journalled in the base plate 118 of a yoke having the side plates 119 journalled on the shaft 114.

120 is another chain sprocket fixed upon the shaft 121 which is journalled in a bearing like the bearing 108 and extends through the inside plate 102 and is provided at its inner end with the diametral drive pin 122 for engagement by the same crank.

The chain sprocket 110 is operatively connected to the screw 65 by means of the sprocket 123 fixed upon the screw and the sprocket chain 124 extending around the sprockets 110 and 123.

By mounting the crank upon the inner end of the shaft 107 and in driving engagement with the pin 109 and turning the crank, the shaft and the bevel gear 106 are turned to turn the bevel gear 105 and the sprocket 110 and thereby turn the screw 65 to vertically adjust the lower end portion of the lower closure element 17.

Referring to Figure 4, the shaft 104 is operatively connected to the screw 39 to turn the screw and vertically adjust the upper end portion of the upper closure element 16. As shown, the shaft is connected to the transfer shaft 125 journalled in bearings secured to the structural member 11 of the door section 9 and is connected to the shaft 104 by the coupling 126. The shaft 125 has secured thereto the chain sprocket 127 and the screw 39 has secured thereto the chain sprocket 128 and these sprockets are connected by the chain 129 extending over the sprockets. By mounting the crank upon the shaft 113 and turning this shaft and the bevel gear 112 the bevel gear 111 is turned to rotate the shaft 104 and thereby rotate the screw 39 to effect vertical adjustment of the upper end portion of the upper closure element 16.

Referring to Figures 19, 21 and 22, the shaft 117 is operatively connected to the lower arm 75 of the bell crank 73 to swing this bell crank and thereby adjust the lower end portion of the upper closure element 16 and the upper end portion of the lower closure element 17 about the pivots for these closure elements toward and away from the fuselage of the airplane. In detail, the shaft 117 is connected to the screw 130 by the coupling 131 and this screw extends through and threadedly engages the nut 132 which is located between and is pivotally mounted on the spaced portions or furcations 133 at the free end of the arm 75 of the bell crank. The construction is such that when the shaft 114 is rotated the screw 130 is rotated and moves the nut 132 longitudinally of the screw thereby turning the bell crank, the screw 130 being movable angularly about the shaft 114 to compensate for the angular movement of the bell crank.

The sprocket 120 is operatively connected to the movable closure device 90 by the sprocket assembly 134, the sprocket chain 135 between the sprocket 120 and the sprocket assembly and the sprocket chain 136 connected to the movable closure device and adapted to be driven by the sprocket assembly. The sprocket assembly has the frame 137 mounted on the door section 9, the shaft 138 journalled in the frame, the chain sprockets 139 and 140 secured to the ends of the shaft and the idler chain sprockets 141 journalled upon the shafts 142 carried by the frame. The chain 136 extends along the convex side of the closure plate 94 and is secured to its ends and has an intermediate portion which is looped over the sprocket 140 and extends over the idler sprockets 141. The frame 137 is positioned to locate the idler sprockets substantially opposite the rollers 96. The chain 135 extends around the sprockets 120 and 139 so that upon rotation of the sprocket 120 by means of the crank mounted upon the shaft 121, the chain 136 and the closure plate 94 are moved to move the closure plate toward or away from the upper closure element, depending upon the direction of rotation of the crank.

Referring to Figures 17 and 18, the closure plate has preferably secured thereto the yieldable sealing element 143, preferably a rubber bulb weathering of conventional construction, for engaging the upper closure element.

For the purpose of holding the lead leaves in closed position with the cushions 37 and 38 in contact, I have provided the fasteners 144 (Figure 2) which, as shown, are in the nature of cane bolts on the leaves engageable in sockets in the floor.

Suitable non-metallic, anti-friction separators are preferably provided on the structural member 12 and the closure devices 89 and 90 for sliding engagement by the upper and lower closure elements 16 and 17 respectively.

To close the opening in the door when the lead leaves are in closed position and no airplane fuselage extends within the opening, I have provided the door leaves 145 at the outside of the lead leaves 1. Referring to Figure 3, the leaves 145 are supported at their upper edges by the trolleys or hangers 146 engaging the horizontal tracks 147 secured to the outsides of the lead leaves. The leaves 145 are guided at their lower edges by suitable means, such as the cooperating guides 148 and 149 on the leaves 145 and the lead leaves 1 respectively. The leaves 145 may be manually moved to their closed positions to bring into engagement the cushions 150 secured to their leading edges, each cushion being preferably a bulb weathering of convention construction.

What I claim as my invention is:

1. An adjustable closure for fitting around an aircraft fuselage comprising aircraft hangar door members cooperating to form an opening for receiving the fuselage, a plurality of closure elements, pivots for said closure elements, means connecting said door members and said pivots for adjusting said pivots and other means connecting said door members and closure elements for adjusting said closure elements about the axes of said pivots to thereby accommodate said closure elements to the fuselage.

2. An adjustable closure for fitting around an aircraft fuselage comprising aircraft hangar door members movable toward each other to form an opening for receiving the fuselage, a plurality of closure elements on each of said door members, and means for universally adjusting said closure elements in a direction parallel to said door members to close the space between said door members and the fuselage.

3. An adjustable closure for fitting around an aircraft fuselage comprising aircraft hangar door members having registering recesses forming an opening for receiving the fuselage, a plurality of closure elements on said door members at the edges of the recesses, and means on said door members and connected to said closure elements for adjusting said closure elements in different directions relative to said door members to encircle and engage the fuselage.

4. An adjustable closure for fitting around an aircraft fuselage comprising aircraft hangar door members having registering recesses forming an opening to receive the fuselage, a plurality of closure elements on said door members having bodies formed with arcuate inner edges and cushions at said inner edges, and means on said door members connected to said bodies for universally adjusting said bodies in a direction parallel to said door members to move said cushions into encircling engagement with the fuselage.

5. An adjustable closure for fitting around an aircraft fuselage comprising aircraft hangar door members cooperating to form an opening for receiving the fuselage, a plurality of closure elements on said door members, and means connected to each of said closure elements at spaced points for separately adjusting each of said closure elements at the spaced points into encircling engagement with the fuselage.

6. An adjustable closure for fitting around an aircraft fuselage comprising aircraft hangar door leaves having registering recesses forming an opening to receive the fuselage, a pair of closure elements on each of said door leaves arranged in transversely offset relation, each of said closure elements being formed of a body and cushioning material mounted on said body, and means on said door leaves connected to said bodies for rectilinearly and angularly adjusting said bodies to move said cushioning material into encircling engagement with the fuselage.

7. An adjustable closure for fitting around an aircraft fuselage comprising aircraft hangar door leaves movable toward and away from each other and having recesses in their adjacent edges forming an opening to receive the fuselage when the leaves are in closed position, a plurality of closure elements adjustably mounted on each of said door leaves for engagement with the fuselage, and auxiliary door leaves mounted on said first mentioned door leaves for closing the opening.

8. In an adjustable closure for fitting around an aircraft fuselage, a hangar door member having a recess, a plurality of closure elements carried by said door member for engaging the fuselage, screws pivotally connected to said closure elements for moving said closure elements relative to said door member, and means common to said closure elements for moving the same about the axes of the pivots of said closure elements.

9. In an adjustable closure for fitting around an aircraft fuselage, a hangar door leaf having a semi-elliptic recess in an edge, upper and lower closure elements extending into the recess, upper and lower screws on said door leaf, nuts engaging said screws and pivotally connected to said upper and lower closure elements, tracks on said upper and lower closure elements, and means engaging said tracks for angularly moving said upper and lower closure elements about their pivots on said nuts.

10. An adjustable closure for fitting around the fuselage and antenna of an aircraft comprising aircraft hangar door members movable toward and away from each other to closed and open positions respectively, said door members having leading edges cooperating in closed position to form a fixed opening for receiving the fuselage and provided with abutting cushions above the opening for receiving the antenna therebetween, a plurality of closure elements carried by said door members having cushions for engaging the fuselage and antenna, and means for adjusting said closure elements.

11. In an adjustable closure for fitting around an aircraft fuselage, an aircraft hangar door member, and an adjustable closure element carried by said door member comprising a body adjustably mounted on said door member, and a yieldable cushion on said body for engagement with the fuselage, said cushion comprising abutting sections and bolts connecting said sections to said body movable longitudinally relative to said body.

12. An adjustable closure for fitting around an aircraft fuselage comprising aircraft hangar door members cooperating to form an opening for receiving a fuselage, adjustable closure elements adjacent to said door members engageable with the fuselage, other adjustable closure elements spaced from said door members and engageable with the fuselage, said other closure elements overlapping said first mentioned closure elements and being spaced from said door members by said first mentioned closure elements, and means for closing the spaces between said door members and said other closure elements having movable closure devices engageable with said first mentioned closure elements.

References Cited in the file of this patent

UNITED STATES PATENTS

| | | |
|---|---|---|
| 2,420,186 | Miller et al. | May 6, 1947 |
| 2,651,359 | Margeson | Sept. 8, 1953 |

FOREIGN PATENTS

| | | |
|---|---|---|
| 481,387 | Great Britain | Mar. 10, 1938 |